(12) United States Patent
Nolden et al.

(10) Patent No.: US 6,253,587 B1
(45) Date of Patent: Jul. 3, 2001

(54) DEVICE AND METHOD FOR COMPRESSING

(75) Inventors: Wolfgang Nolden, Cologne; Herward Graning, Euskirchen, both of (DE)

(73) Assignee: NKT Cables GmbH (DE)

( * ) Notice: Subject to any disclaimer, the term of this patent is extended or adjusted under 35 U.S.C. 154(b) by 0 days.

(21) Appl. No.: 09/509,295

(22) PCT Filed: Sep. 17, 1998

(86) PCT No.: PCT/EP98/05923

§ 371 Date: Jun. 19, 2000

§ 102(e) Date: Jun. 19, 2000

(87) PCT Pub. No.: WO99/15929

PCT Pub. Date: Apr. 1, 1999

(30) Foreign Application Priority Data

Sep. 23, 1997 (DE) .............................. 197 41 934

(51) Int. Cl.⁷ ...................................... B21D 3/02
(52) U.S. Cl. .................... 72/7.4; 72/8.4; 72/37; 72/164
(58) Field of Search ............... 72/7.4, 8.4, 11.2, 72/37, 160, 164

(56) References Cited

U.S. PATENT DOCUMENTS 4,768,363 * 9/1988 Yamashita ........................ 72/160
5,653,022 * 8/1997 Logic ................................. 29/414
6,061,905 * 5/2000 Logic ................................. 29/33 T

FOREIGN PATENT DOCUMENTS 33 23 623  6/1983 (DE) .
41 37 459  11/1991 (DE) .

* cited by examiner

Primary Examiner—Daniel C. Crane
(74) Attorney, Agent, or Firm—Harness, Dickey & Pierce, P.L.C.

(57) ABSTRACT

The invention relates to a device and method for regulating the compressing of metal tubing (20) having inner-lying beam wave guides (8) by means of a roll straightening passage (10a, 10b) comprising a feeding device (36, 36') of the rollers (12–16) with regard to the angle of wrap (A1, A2). The metal tubing (20) is unwound by a feed roller (11) in front of the roll straightening passage delivery roller (11') after said roll straightening passage (10a, 10b). According to the invention, a measuring device (34) for determining the velocity (v1, v2) of the metal tubing (20) is arranged in front of and behind each roll straightening passage (10a, 10b). The measuring device (30) can determine the difference in velocity in front of and behind the roll straightening passage and the feeding device (36, 36') can be adjusted independently of the difference in velocity.

7 Claims, 2 Drawing Sheets

DEVICE AND METHOD FOR COMPRESSING

Figure 1:
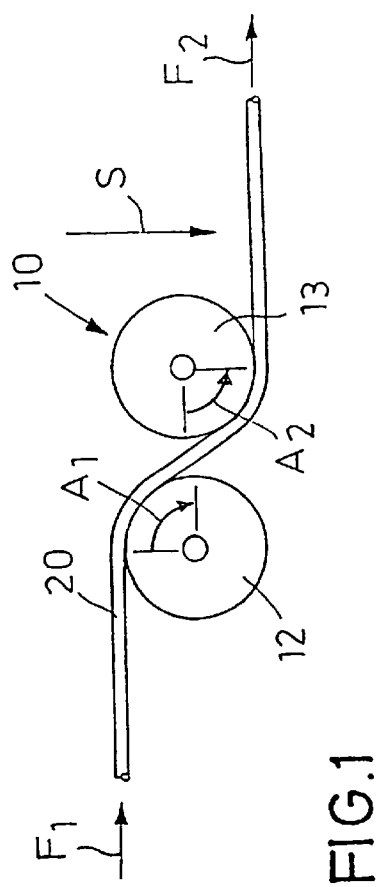

This application is a 371 of PCT/EP98/05923, published on Apr. 1, 1999, as WO 99/15929.

The invention relates to regulating a compressing device a corresponding method.

During the manufacture of metal tubing that contains light wave guides, an excessive length must be set in the metal tubing for the light wave guides. There are various methods for this purpose. One of the methods, which is used either alone or in combination with other methods, involves transporting metal tubing with light wave guides through a roll straightening passage. During transport, the metal tubing is bent by wrapping around a roller, and then bent back to the same degree. This shortens or compresses the metal tubing to an extent depending on the diameter of the metal tubing, the diameter of the roll straightening passage rollers, and the angle of wrap of the rollers (Internat. Wire & Cable Symp. Proceedings 1990, pp. 37–43). The compression lies in a length range (several per thousand) that corresponds to the excessive length desired for the light wave guide(s).

The object of the invention is to indicate a compressing device for metal tubing in which the excessive length of the light wave guides is easy to monitor and regulate.

Regulating the compressing device and corresponding compressing method according to the invention enables an improvement in quality, since the excessive length can be numerically preset, and the setpoint is automatically converted by the device or method. In addition, direct on-site production monitoring is possible.

As a rule, a roll straightening passage has a number of fixed rollers and a number of adjustable rollers, which can be moved into the gaps between the first rollers. However, use can also be made of roll straightening passages in which each roller moves in the feeding device (immersion depth between neighboring rollers). The angle of wrap, and hence the level of elastic and permanent plastic deformation, depend on the diameter of the rollers, immersion depth and distance between the adjacent rollers. A suitable roll straightening passage can consist of two rollers, but preferably out of a odd number of rollers (at least three). In the latter case, there is a symmetrical arrangement in which the forces attack symmetrically. Use can also be made of roll straightening passages in which the rollers vary in diameter, e.g., alternate between large and small.

The shortening effect stems from plastic deformation, which increases the wall thickness of the metal tubing. The reduction in length of the tubing is transformed into a thickening of the wall. Due to the reduction in length, the tubing exiting the roll straightening passage has a slightly, but measurably lower velocity than at the entry side of the roll straightening passage. This velocity difference is to be used for the quantitative regulation of shortening.

The essence of the device is that a measuring device for determining the velocity of the metal tubing (preferably special steel) is arranged in front of and behind each roll straightening passage, wherein the measuring device can determine the difference in velocity in front of and behind the roll straightening passage, and the feeding device can be adjusted depending on the difference in velocity.

The measuring device preferably measures without contact. To this end, electrical or optical methods are possible. One elegant method is optical velocity measurement, while other methods can be based on the radar principle (microwave measurement).

The metal tubing passes through the roll straightening passage in one plane. It has proven advantageous to arrange two roll straightening passages one after the other, wherein one is arranged perpendicular relative to the other. The rollers of the straightening passage have a circular (hollow) profile that corresponds to the outside diameter of the metal tubing. However, since the metal tubing becomes deformed, it has proven favorable for the rollers in the roll straightening passage to exhibit an oval profile, and for the small axis of the oval (ellipse) to lie parallel to the roller axis.

Proposed in addition to the device is a method for compressing a metal tubing with at least one inner-lying light wave guide using a roll straightening passage comprising a feeding device of the rollers with regard to the angle of wrap, wherein the metal tubing is unwound by a feed roller in front of the roll straightening passage, and is wound on a delivery roller after the roll straightening passage. In this case, the velocity of the metal tubing is measured in front of and behind the roll straightening passage, the difference in velocity in front of and behind the roll straightening passage is determined from the measurement, and the difference in velocity is used as a manipulated variable for the feeding device. The manipulated variables can be relayed to motors that twist the setscrews of the roll straightening passage.

The feeding device is preferably controlled automatically by the manipulated variable (velocity difference).

The method can preferably be refined in such a way that the drives of the feed roller and delivery roller are regulated as a function of the difference in velocity. This means that, proceeding from a synchronous velocity of the feed and delivery roller, a small difference in velocity is factored in, which fluctuates within a range of several per thousand. To this end, the feed roller could also be decelerated relative to the delivery roller.

Figure 2:
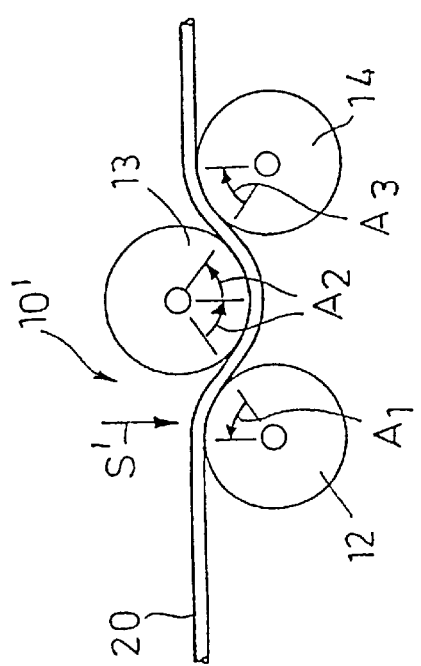
Figure 3:
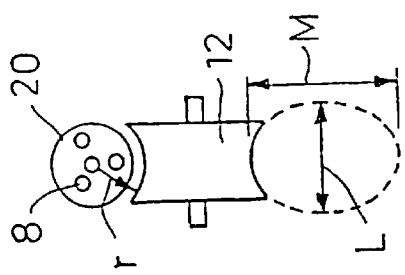
Figure 4:
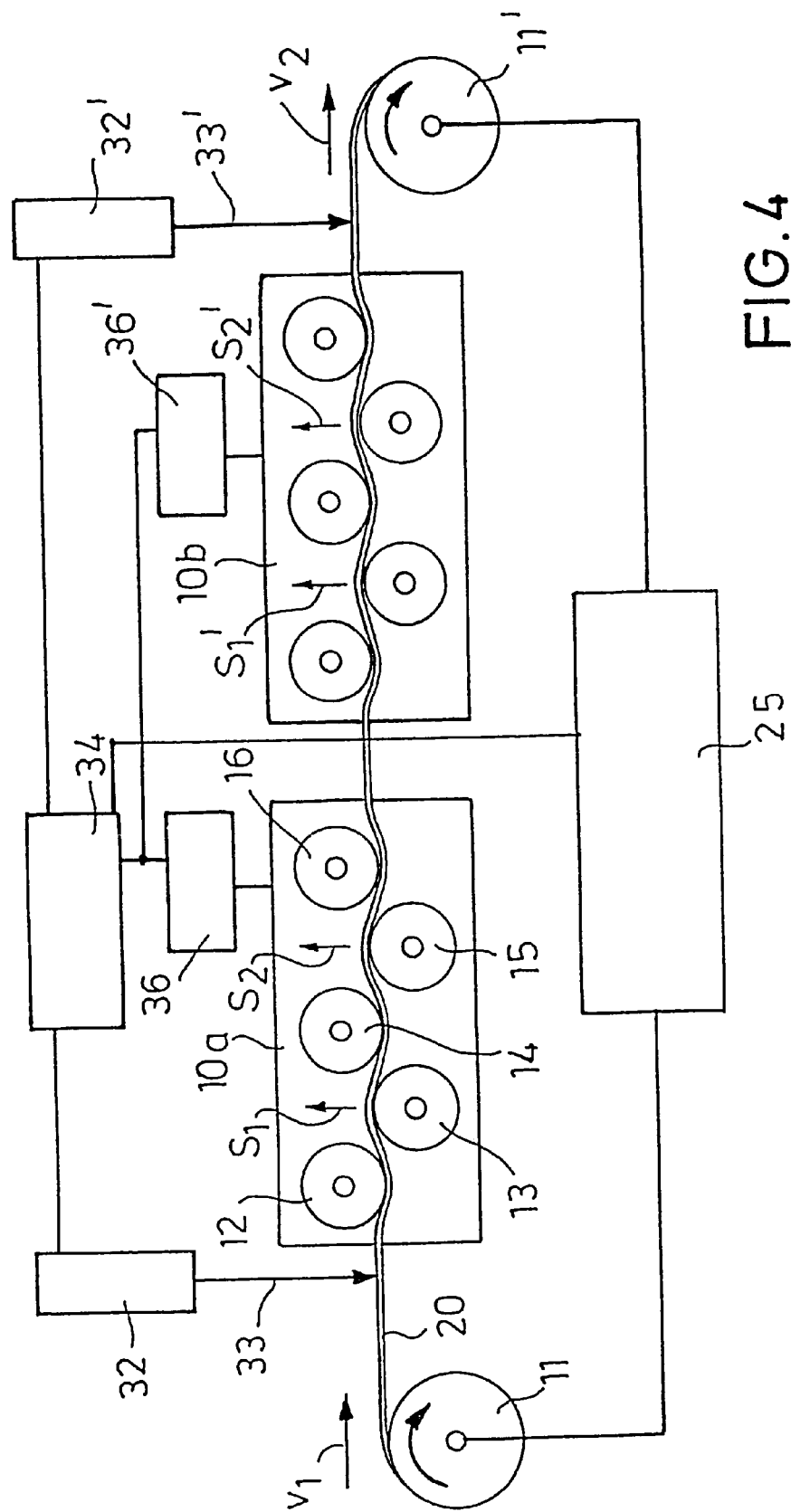

The figures depict an embodiment of the invention. Shown on:

FIG. 1 is a roll straightening passage with two rollers,
FIG. 2 is a roll straightening passage with three rollers,
FIG. 3 is the profile of a roller, and
FIG. 4 is a compressing device with measuring device.

FIG. 1 shows a roll straightening passage 10 with two rollers 12, 13, and FIG. 2 shows a roll straightening passage 10' with three rollers 12, 13, 14 (with an identical diameter). Roller 13 can be advanced in direction S (arrow direction and arrow length S, immersion depth). The angle of wrap A forms as a function of the roller diameter, immersion depth S and distance between the adjacent rollers. The wrap (angle A1, A2) of the metal tubing 20 around the rollers is about 90° in FIG. 1, i.e., relatively high. In FIG. 2, the feed level S' of the middle roller 13 is lower than feed level S in FIG. 1, and the angle of wraps A1, A2, A3 are correspondingly lower, namely about 45 °.

The metal tubing is passed through the roll straightening passage at a specific force F1 from the delivery roller 11 (FIG. 1), and wound on the winding roller 11' (FIG. 1). As mentioned, the drive of the feed and delivery rollers can be controlled in such a way as to minimize the forces on the metal tubing. Suitable roller diameters are 20 to 40 mm, preferably 30 mm. Metal tubes made out of special steel with outside diameters of 3 to 4 mm are processed in this way.

FIG. 3 shows the profile of a roller 12. As a rule, the profile has the same radius r as the outside radius of the metal tubing 20. An oval with two axes L, M is shown at the bottom of FIG. 3. The smaller axis L lies parallel to the axis of roller 12, as a result of which the pressure on the metal tubing 20 generates as close to no ovality as possible. Four light wave guides 8 are indicated in the metal tubing.

FIG. 4 essentially depicts the measuring and control device in a (double) roll straightening passage, which is comprised of a first roll straightening passage 10a followed by another one 10b. The axes of the rollers in the second roll straightening passage 10b are perpendicular to the axes of the rollers of the first one 10a. The feed variables for two moveable rollers are indicated with S1, S2, S1' and S2'. Feeding is controlled by means of a device 36, 36' that operates on setscrews, either manually or motor-driven. The feed controller 36 and/or controller 25 of the drive of the feed 11 and delivery 11' is actuated via the measuring device 34 for the velocity. 32, 32' denote lasers, whose light beams 33, 33' are used to measure the velocity of the metal tubing 20 in front of and behind the roll straightening passage, v1 and v2 are the velocities of the metal tubing 20 in front of and behind the roll straightening passage. Here, velocity v2 is lower than velocity v1 due to the compressing process. The excessive lengths achieved by the compression lie within several (1 to 6) per thousand.

What is claimed is:

1. A device for regulating the compressing of metal tubing including at least one light wave guide lying within said metal tubing, a first straightening device for straightening said metal tubing wherein said first straightening device includes at least two deflection rollers, at least one of said deflection rollers being a moveable deflection roller, a feeding device for at least one of the deflection rollers wherein said metal tubing has a variable angle of wrap around said moveable deflection rollers, and a feed roller for unwinding said metal tubing on a first side of said straightening device and a delivery roller for winding said metal tubing on a second side of said straightening device, wherein said moveable deflection rollers are adjustable as a function of a difference between a feeding velocity of said metal tubing and a delivery velocity of said metal tubing, said device comprising:

a measuring device for measuring multiple velocities of said metal tubing, said measuring device arranged on said first side and said second side of said straightening device to determine the difference in velocity of said metal tubing between said first side of said straightening device and said second side of said straightening device; and a drive device to control a feed roller drive and a delivery roller drive, said drive device located between said feed roller and said delivery roller, wherein said drive device changes the velocity on said first side and said second side of said straightening device to control the tensile forces on said metal tubing.

2. The device according to claim 1, wherein said measuring device further comprises a non-contact measuring device.

3. The device according to claim 1, wherein said measuring device further comprises an optical measuring device.

4. The device according to claim 1, further comprising a second straightening device perpendicular to said first straightening device.

5. The device of claim 1, wherein said deflection rollers of said straightening device have an oval profile.

6. A method for regulating the compressing of metal tubing having at least one inner-lying light wave guide with at least one straightening device, said straightening device including at least one deflection roller and at least one moveable deflection roller, a feed roller to feed said metal tubing into said deflection rollers, a feeding device associated with said feed roller wherein said feeding device controls said at least one moveable deflection roller and an angle of wrap of said metal tubing around said at least one moveable deflection roller, a feed roller drive to rotate said feed roller, said deflection rollers to compress said metal tubing, a delivery roller accepting said metal tubing after compression by said deflection rollers, and a delivery roller drive to rotate said delivery roller, said method comprising:

measuring a first velocity of said metal tubing upon leaving said feed roller;

measuring a second velocity of said metal tubing upon arriving at said delivery roller;

determining the difference between said first velocity and said second velocity and generating a manipulated variable with said difference;

adjusting said feeding device according to said manipulated variable; and adjusting said drives of said feed roller and said delivery roller according to said manipulated variable in order to minimize the tensile forces on said metal tubing.

7. The method according to claim 6, wherein the manipulated variable automatically controls the feeding device.

* * * * *